United States Patent [19]

Sasaki et al.

[11] Patent Number: 4,938,307
[45] Date of Patent: Jul. 3, 1990

[54] POWER TRANSFER DEVICE FOR FOUR-WHEEL DRIVE

[75] Inventors: Kan Sasaki, Nagoya; Keisuke Takimura; Nobuaki Katayama, both of Toyota, all of Japan

[73] Assignee: Toyota Jidosha Kabushiki Kaisha, Japan

[21] Appl. No.: 327,104

[22] Filed: Mar. 22, 1989

[30] Foreign Application Priority Data

Mar. 23, 1988 [JP] Japan .................................. 63-38195

[51] Int. Cl.$^5$ .............................................. B60K 23/08
[52] U.S. Cl. .................................. 180/247; 74/665 F; 74/665 T
[58] Field of Search ......................... 180/247, 233, 248; 74/665 R, 665 F, 665 G, 665 S, 665 T

[56] References Cited

U.S. PATENT DOCUMENTS 3,058,558 10/1962 Hawk ................................. 180/247 X
4,625,584 12/1986 Onodera ........................... 180/247 X
4,802,383 2/1989 Katayama et al. ............. 180/247 X

FOREIGN PATENT DOCUMENTS 29162 2/1986 Japan .
109831 7/1986 Japan .

*Primary Examiner*—Charles A. Marmor
*Assistant Examiner*—Alan M. Kagen
*Attorney, Agent, or Firm*—Oliff & Berridge

[57] ABSTRACT

In a power transfer device for four-wheel drive including a differential arranged to split the driving torque from a power transmission into two torque delivery paths, a first output shaft assembly in drive connection to the differential to transfer the split driving torque to front or rear-wheel drive axles and a second output shaft assembly in drive connection to the differential to transfer the split driving torque to rear or front-wheel drive axles, one of the output shaft assemblies being composed of a pair of split shafts, a shift mechanism includes a clutch sleeve slidably mounted on one of the split shafts for rotation therewith and shiftable between a first position where it is engaged with the other split shaft and a second position where it is disengaged from the other split shaft, a manually operated plug member rotatably coupled within a corresponding bore in the peripheral wall of a housing of the transfer device, and a fastening bolt threaded into the peripheral wall of the housing to fasten the plug member to the housing at a rotated position, the plug member having an inner end portion integrally provided with an eccentric cam pin which is engaged with an annular groove formed on the clutch sleeve.

2 Claims, 3 Drawing Sheets

POWER TRANSFER DEVICE FOR FOUR-WHEEL DRIVE

BACKGROUND OF THE INVENTION

1. Field of the Invention

The present invention relates to a power transfer device for four-wheel drive in automotive vehicles, and more particularly to a power transfer device of the type in which a shift mechanism is arranged to temporarily provide a two-wheel drive mode.

2. Discussion of the Background

Disclosed in Japanese Utility Model Early Publication No. 61-109831 is a power transfer device which includes a center differential of the bevel gear type arranged to split the driving torque from a power transmission into two torque delivery paths respectively for front-wheel drive and rear-wheel drive, a front differential of the beve gear type arranged coaxially with the center differential to transfer the split driving torque from a first side gear of the center differential to front-wheel axles, and an output ring gear arranged coaxially with the center differential and in surrounding relationship with a hollow shaft extending from a second side gear of the center differential to transfer the split driving torque from the second side gear to rear-wheel axles through an output gearing assembly. In the transfer device, a clutch sleeve is axially slidably mounted on the hollow shaft for rotation therewith and shiftable between a first position where it is engaged with a mounting case of the output ring gear to provide a four-wheel drive mode and a second position where it is disengaged from the mounting case of the output ring gear to provide a two-wheel drive mode. A shift mechanism of the clutch sleeve includes a shift fork coupled with the clutch sleeve and carried on an axially slidable fork shaft, an operation mechanism of the fork shaft, and a detent mechanism arranged to retain the fork shaft in a shifted position.

In the case that the power transfer device is adapted to a full-time four-wheel drive vehicle, the clutch sleeve is shifted to the second position only when the vehicle is placed on a chassis dynamometer at its front or rear road wheels for measurement of emission gas, rate of fuel consumption or the like or when the vehicle is trailed in a condition where it is suspended from a tractor at its front or rear road wheels. In such adaptation of the power transfer device, utility value of the shift mechanism becomes less than in a part-time four-wheel drive vehicle. It is, therefore, desirable that the shift mechanism is composed of a small number component parts and manufactured possibly at a low cost.

SUMMARY ON THE INVENTION

Accordingly, a main object of the present invention is to provide an improved power transfer device the shift mechanism of which can be provided in a simple construction at a low cost.

According to the present invention, the object is attained by providing a power transfer device for four-wheel drive in combination with a power transmission which comprises a differential arranged to split the driving torque from the power transmission into two torque delivery paths respectively for front-wheel drive and rear-wheel drive, a first output shaft assembly in drive connection to the differential to transfer the split driving torque to front or rear-wheel drive axles, a second output shaft assembly in drive connection to the differential to transfer the split driving torque to rear or front-wheel drive axles, one of the output shaft assemblies being composed of a pair of split shafts, and a shift mechanism including a clutch sleeve slidably mounted on one of the split shafts for rotation therewith and shiftable between a first position where it is engaged with the other split shaft to select a four-wheel drive mode at the transfer device and a second position where it is disengaged from the other split shaft to select a two-wheel drive mode at the transfer device. The power transfer device is characterized in that the shift mechanism includes a manually operated plug member rotatably coupled within a corresponding bore in the peripheral wall of a housing of the transfer device, the plug member having an inner end portion integrally provided with an eccentric cam pin which is displaced in a predetermined distance from the rotation axis of the plug member and engaged with an annular groove formed on the clutch sleeve, and means for releasably fastening the plug member to the housing at a rotated position.

In a pratical embodiment of the present invention, it is preferable that the plug member is integrally formed with a flange portion to be fastened to the housing and has a columnar and a hexagonal head which are integrally formed with the flange portion for rotation therewith, the columnar body having an inner end integrally formed with the eccentric cam pin and being rotatably coupled within the corresponding bore in the peripheral wall of housing and that the means for releasably fastening the plug member is in the form of a fastening bolt threaded into the peripheral wall of the housing through a hole in the flange portion of the plug member. Alternatively, it is preferable that the plug member is made of pressed sheet metal and has a cup-shaped cylindrical body extruded from its central portion, a grip portion, and a flange portion in which is formed a semi-circular hole, the cylindrical body being provided at a bottom thereof with the eccentric cam pin and being rotatably coupled within the corresponding bore in the peripheral wall of the housing, and that the means for releasably fastening the plug member is in the form of a fastening bolt threaded into the peripheral wall of the housing through the semi-circular hole in the flange portion of the plug member.

BRIEF DESCRIPTION OF THE DRAWINGS

Additional objects, features and advantages of the present invention will be readily appreciated from the following detailed description of preferred embodiments thereof when considered with reference to the accompanying drawings, in which.

DESCRIPTION OF THE PREFERRED EMBODIMENTS

Figure 1:
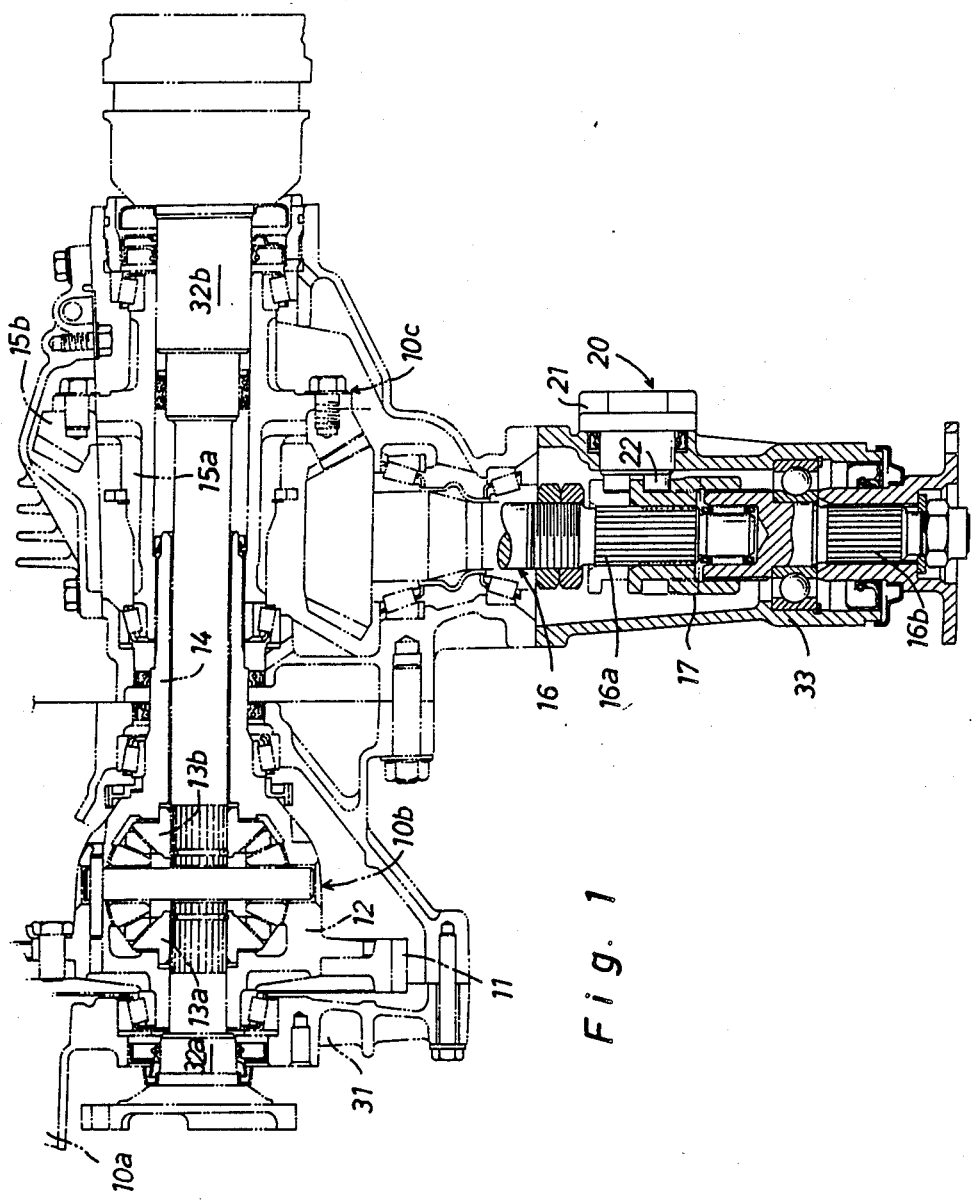
FIG. 1 is a sectional plan view of a power transfer device for four-wheel drive in accordance with the present invention.

Referring now to the drawings, FIG. 1 illustrates a power transfer device in accordance with the present invention which is adapted to a power transmission 10a for an automotive vehicle of the front-engine front-wheel drive type. The power transmission 10a is fixedly mounted to one side of an internal combustion engine (not shown) through a clutch mechanism (not shown) in a usual manner. The engine is transversely mounted on the vehicle. The power transfer device includes a front differential 10b of the bevel gear type for front-wheel drive, an output gearing assembly 10c for rear-wheel drive, and a shift mechanism 20 for selectively providing a two-wheel drive mode or a four-wheel drive mode. The front differential 10b is arranged within a transmission housing 31 to split the driving torque from the power transmission 10a into two torque delivery paths respectively for front-wheel drive and rear-wheel drive.

The front differential 10b includes an input ring gear 11 arranged to be applied with the driving torque from the power transmission 10a a differential casing 12 rotatably mounted within the transmission housing 31, a pair of pinion gears rotatably mounted within the differential casing 12 by means of a cross-shaft, and a pair of side gears 13a, 13b rotatably mounted within the differential casing 12 and in mesh with the pinion gears. The ring gear 11 is fixedly mounted on the differential casing 12 for rotation therewith. A hollow shaft 14 is integrally formed with the differential casing 12 to transfer the split driving torque therethrough to the output gearing assembly 10c. A pair of solid side shafts 32a, 32b are connected at their inner ends to the side gears 13a and 13b to transfer the split driving torque therethrough to the front road wheels of the vehicle.

The output gearing assembly 10c for rear-wheel drive includes a mounting case 15a, an output ring gear 15b and a drive pinion shaft assembly 16. The mounting case 15a is arranged coaxially with the front differential 10b and in surrounding relationship with the right-hand side shaft 32b. The mounting case 15a is rotatably mounted within an extension housing 33 secured to the right end of transmission housing 31 and located in a fore-and-aft direction of the vehicle. The mounting case 15a has a hollow shaft portion coupled with the hollow shaft 14 for rotation therewith. The output ring gear 15b is fixedly mounted on the mounting case 15a to transfer the split driving torque from the hollow shaft 14 to the drive pinion shaft assembly 16. The drive pinion shaft assembly 16 is composed of a pair of split shafts 16a, 16b which are coaxially arranged with each other and rotatably mounted within the extension housing 33. The inner shaft 16a is integrally formed with a pinion which is permanently in mesh with the output ring gear 15b. The outer shaft 16b has an externally splined inner end portion coupled with an outer end of inner shaft 16a through a needle bearing for relative rotation. A companion flange for drive connection to a propeller shaft (not shown) is splined to the outer end of shaft 16b.

Figure 2:
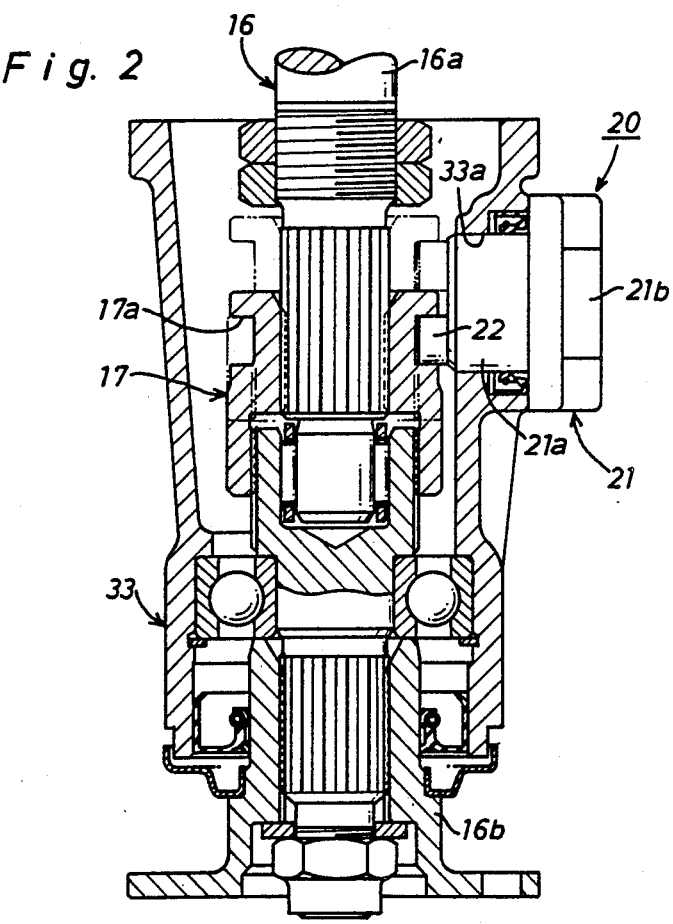
FIG. 2 is an enlarged sectional plan view illustrating in detail component parts of a shift mechanism shown in FIG. 1.

The shift mechanism 20 includes an internally splined clutch sleeve 17 slidably mounted on an externally splined portion of inner shaft 16a and shiftable between a first position where it is engaged with the externally splined inner end portion of shaft 16b to provide a drive connection between shafts 16a and 16b a second position where it is disengaged from the externally splined inner end portion of shaft 16b to disconnect the drive connection between the shafts 16a and 16b. As clearly shown in FIGS. 2 and 3, the shift mechanism 20 further includes a manually operated plug member 21 having an inner and integrally formed with an eccentric cam pin 22 and a flange portion 21c positioned in place by means of a fastening bolt 23 threaded into the extension housing 33 therethrough. The plug member 21 has a columnar body 21a and a hexagonal head 21b which are integrally formed with the flange portion 21c for rotation therewith. The columnar body 21a is rotatably coupled within a corresponding stepped bore 33a in the peripheral wall of extension housing 33, and the hexagonal head 21b is arranged to be rotated by a tool such as a spanner. The cam pin 22 is displaced in a predetermined distance from the central axis of columnar body 21a and is engaged with an annular groove 17a formed on the clutch sleeve 17. The flange portion 21c of plug member 21 is formed with a hole 21d through which the fastening bolt 23 is selectively threaded into a pair of diametrically opposed holes 33b and 33c in the peripheral wall of extension housing 33.

Figure 3:
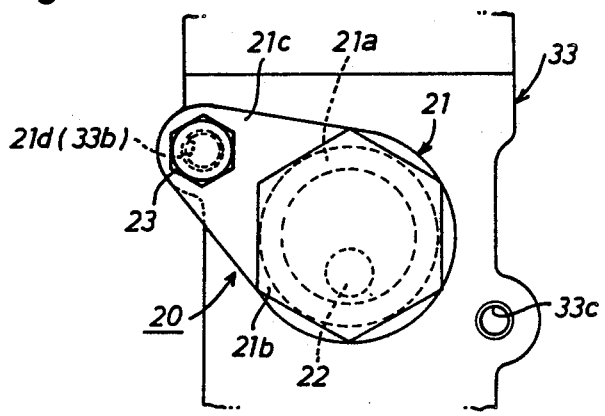
FIG. 3 is a front view of a manually operated plug member in the shift mechanism.

In the above arrangement, the plug member 21 is rotatably coupled within the stepped bore 33a at its columnar body 21a in a liquid-tight manner such that the cam pin 22 is engaged with the annular groove 17a of clutch sleeve 17 and is fastened to the extension housing 33 by means of bolt 23 threaded into one of the holes 33b, 33c. Assuming that the fastening bolt 23 has been threaded into the hole 33b as shown in FIG. 3, the clutch sleeve 17 is retained in the first position by engagement with the cam pin 22 of plug member 21 to provide the drive connection between the shafts 16a and 16b for four-wheel drive. When it is desired to select a two-wheel drive mode at the power transfer device in a condition where the vehicle is placed on a chassis dynamometer at its front wheels or suspended from a tractor at its front wheels, the fastening bolt 23 is removed to release the plug member 21 from the extension housing 33, and the plug member 21 is rotated by the tool toward a position where the hole 21d of flange portion 21c coincides with the opposite hole 33c. Thus, as shown by two dots and dash lines in FIG. 2, the cam pin 22 rotates with the plug member 21 to shift the clutch sleeve 17 to the second position. Thereafter, the fastening bolt 23 is threaded into the holes 33c to fasten the plug member 21 in the rotated position. As a result, the drive connection between shafts 16a and 16b is disconnected to provide the two-wheel drive mode at the power transfer device.

Figure 4:
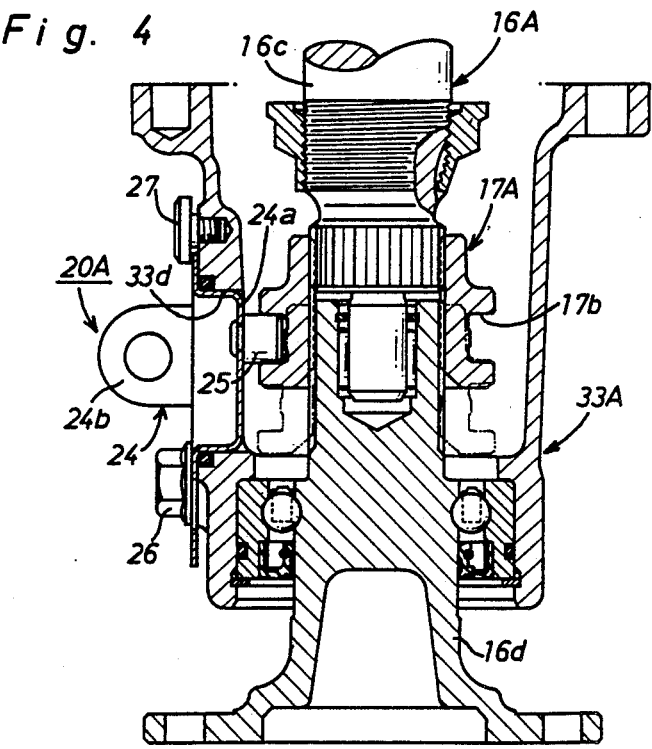
FIG. 4 is a sectional plan view of a modification of the shift mechanism shown in FIG. 2.
Figure 5:
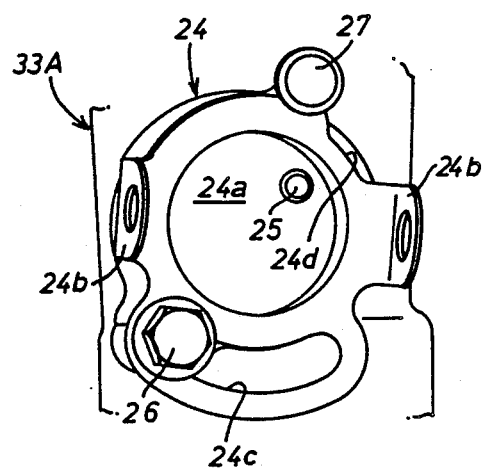
FIG. 5 is a front view of a manually operated plug member of sheet metal in the modification.

In FIGS. 4 and 5 there is illustrated a modification 20A of the shift mechanism 20 wherein the drive pinion shaft assembly 16 is replaced with a drive pinion shaft assembly 16A which includes a pair of split shafts 16c, 16d coaxially arranged with each other and rotatably mounted within a housing 33A, and wherein the shift mechanism 20 is replaced with a shift mechanism 20A which includes an internally splined clutch sleeve 17A slidably mounted on an externally splined inner end portion of shaft 16d and shiftable between a first position where it is engaged with an externally splined portion of shaft 16c for four-wheel drive and a second position where it is disengaged from shaft 16c for two-wheel drive. The shift mechanism 20A further includes a plug member 24 of pressed sheet metal, an eccentric cam pin 25, a fastening bolt 26 and a stepped retainer pin 27. The plug member 24 has a cup-shaped cylindrical body 24a extruded from its central portion, a pair of opposed grip portions 24b, 24b, a flange portion in which is formed a semi-circular hole 24c, and a semi-circular recessed portion 24d. The eccentric cam pin 25 is secured to a bottom of cylindrical body 24a at a position displaced in a predetermined distance from the central axis of body 24a and is arranged to be engaged with an annular groove 17b formed on the clutch sleeve 17A. The stepped retainer pin 27 is previously threaded into the peripheral wall of housing 33A.

During assembly process of the shift mechanism 20A, the plug member 24 is rotatably coupled within a corresponding bore 33d of housing 33A in such a manner that the semi-circular recessed portion 24d is located at the retainer pin 27 and that the cam pin 25 is engaged with the annular groove 17b of clutch sleeve 17A. When rotated in a clockwise direction, the plug member 24 is engaged with the retainer pin 27 at its rim portion. Thereafter, the fastening bolt 26 is threaded into the peripheral wall of housing 33A through the semi-circular hole 24c in the flange portion to fasten the plug member 24 to the housing 33A. Assuming that the plug member 24 has been fastened in a position shown in FIG. 5. The clutch sleeve 17A is retained in the first position by engagement with the cam pin 25 to provide a drive connection between the shifts 16c and 16d for four-wheel drive. When it is desired to select a two-wheel drive mode at the power transfer device, the fastening bolt 26 is temporarily loosened to permit clockwise rotation of the plug member 24. After the plug member 24 has been rotated to a leftward stroke end by means of an appropriate tool engaged at its grip portions 24b, the fastening bolt 26 is fastened to retain the plug member 24 in position. In such a condition, the clutch sleeve 17A is retained in the second position by engagement with the cam pin 25 to disconnect the drive connection between shafts 16c and 16d for two-wheel drive.

Having now fully set forth the structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therfore, that within the scope of the appended claims, the invention may be praticed otherwise than as specifically set forth herein.

What is claimed is:

1. A power transfer device for four-wheel drive in combination with a power transmission, comprising:
   a differential arranged to split the driving torque from said power transmission into two torque delivery paths respectively for front-wheel drive and rear-wheel drive;
   a first output shaft assembly in drive connection to said differential to transfer the split driving torque to front or rear-wheel drive axles;
   a second output shaft assembly in drive connection to said differential to transfer the split driving torque to rear or front-wheel drive axles, one of said output shaft assemblies being composed of a pair of split shafts; and
   a shift mechanism including a clutch sleeve slidably mounted on one of said split shafts for rotation therewith and shiftable between a first position where it is engaged with the other split shaft to select a four-wheel drive mode at the transfer device and a second position where it is disengaged from the other split shaft to select a two-wheel drive mode at the transfer device;
   wherein said shift mechanism includes a manually operated plug member rotatably coupled within a corresponding bore in a peripheral wall of a housing of said transfer device, said plug member having an inner end portion integrally provided with an eccentric cam pin which is displaced in a predetermined distance from the rotation axis of said plug member and engaged with an annular groove formed on said clutch sleeve, said plug member being integrally formed with a flange portion to be fastened to said housing and having a columnar body and a hexagonal head which are integrally formed with said flange portion for rotation therewith, said columnar body having an inner end integrally formed with said eccentric cam pin and being rotatably coupled within the corresponding bore in the peripheral wall of said housing, and means for releasably fastening said plug member to said housing at a rotated position, said means for releasably fastening said plug member being in the form of a fastening bolt threaded into the peripheral wall of said housing through a hole in the flange portion of said plug member.

2. A power transfer device for four-wheel drive in combination with a power transmission, comprising:
   a differential arranged to split the driving torque from said power transmission into two torque delivery paths respectively for front-wheel drive and rear-wheel drive;
   a first output shaft assembly in drive connection to said differential to transfer the split driving torque to front or rear-wheel drive axles;
   a second output shaft assembly in drive connection to said differential to transfer the split driving torque to rear or front-wheel drive axles, one of said output shaft assemblies being composed of a pair of split shafts; and
   a shift mechanism including a clutch sleeve slidably mounted on one of said split shafts for rotation therewith and shiftable between a first position where it is engaged with the other split shaft to select a four-wheel drive mode at the transfer device and a second position where it is disengaged from the other split shaft to select a two-wheel drive mode at the transfer device;
   wherein said shift mechanism includes a manually operated plug member rotatably coupled within a corresponding bore in a peripheral wall of a housing of said transfer device, said plug member having an inner end portion integrally provided with an eccentric cam pin which is displaced in a predetermined distance from the rotation axis of said plug member and engaged with an annular groove formed on said clutch sleeve, said plug member being made of pressed sheet metal and having a cup-shaped cylindrical body pressed from its central portion, a grip portion, and a flange portion in which is formed a semi-circular hole, said cylindrical body being provided at a bottom thereof with said eccentric cam pin and being rotatably coupled within the corresponding bore in the peripheral wall of said housing, and means for releasably fastening said plug member to said housing at a rotated position, said means for releasably fastening said plug member being in the form of a fastening bolt threaded into the peripheral wall of said housing through the semi-circular hole in the flange portion of said plug member.

* * * * *